United States Patent
Lin et al.

(10) Patent No.: US 7,558,208 B2
(45) Date of Patent: Jul. 7, 2009

(54) METHOD FOR BALANCING THE LOAD OF A WIRELESS LOCAL AREA NETWORK

(75) Inventors: Ying-Chien Lin, Hsinchu (TW); Chi-Chih Kuo, Bau-Shan Hsiang (TW)

(73) Assignee: Infineon Technologies Taiwan Co., Ltd., Hsinchu (TW)

( * ) Notice: Subject to any disclaimer, the term of this patent is extended or adjusted under 35 U.S.C. 154(b) by 853 days.

(21) Appl. No.: 10/772,650

(22) Filed: Feb. 4, 2004

(65) Prior Publication Data

US 2004/0199668 A1 Oct. 7, 2004

(30) Foreign Application Priority Data

Apr. 4, 2003 (TW) .............................. 92107842 A

(51) Int. Cl.
*G01R 31/08* (2006.01)
*G06F 11/00* (2006.01)
*G08C 15/00* (2006.01)
*H04W 4/00* (2009.01)
*H04J 1/16* (2006.01)
*H04J 3/14* (2006.01)
*H04L 1/00* (2006.01)

(52) U.S. Cl. .................. 370/238; 370/235; 370/338

(58) Field of Classification Search .............. 370/238, 370/238.1, 124, 236.1, 237, 338, 400–408, 370/389, 392, 466, 468, 399, 395.5; 455/453

See application file for complete search history.

(56) References Cited

U.S. PATENT DOCUMENTS 6,671,259 B1 * 12/2003 He et al. .................... 370/238
6,842,460 B1 * 1/2005 Olkkonen et al. .......... 370/465

* cited by examiner

*Primary Examiner*—Duc Nguyen
*Assistant Examiner*—Eugene Yun
(74) *Attorney, Agent, or Firm*—Eschweiler & Associates, LLC

(57) ABSTRACT

The method of the present invention selects an access point with the lowest load, which will reply to the probe-request packet sent by a station, and then constructs an association between the station and the access point with the lowest load so as to balance the load of the plurality of access points. To select the access point with the lowest load, a master access point sends a load collection packet, and the access points with the same service set identifier send a load index packet when receiving the load collection packet. Afterward each access point performs a load comparison procedure to select the access point with the lowest load. The access point with the lowest load will turn on the probe-response function, and the other access point will turn off the probe-response function.

9 Claims, 7 Drawing Sheets

| Function ID | Signature | Group ID | ...... |
|---|---|---|---|
| 0 | "ADMTEK" | AAAA | |
| 1 | "ADMTEK" | AAAA | |

50 — (row with Function ID 0)
51 — (row with Function ID 1)

| Function ID | Signature | Group ID | Sequence # | Load index | ...... |
|---|---|---|---|---|---|
| 2 | "ADMTEK" | AAAA | XXXX | N/A | |
| 3 | "ADMTEK" | AAAA | XXXX | ABCD | |

52 → row with Function ID 2; 53 → row with Function ID 3

| Function ID | Signature | Group ID | Load index | ...... |
|---|---|---|---|---|
| 4 | "ADMTEK" | AAAA | ABCD | |

54

METHOD FOR BALANCING THE LOAD OF A WIRELESS LOCAL AREA NETWORK

BACKGROUND OF THE INVENTION (A) Field of the Invention

The present invention relates to a method for balancing the load of a wireless local area network, and more particularly, to a method for balancing the load of a wireless local area network with a plurality of access points, which conforms to IEEE 802.11 protocol.

(B) Description of the Related Art

In order to avoid jamming, it is better for a wireless local area network group in the same circumstance to use different channels separated by at least 25 MHz. For example, the available channel in the same circumstance are Channel 1, 6 and 11 for Northern America, Channel 1, 7 and 13 for European, and 1, 8 and 13 for Japan. Therefore, to install a plurality of access points (AP) in the same circumstance, it is better for the access points to use different channels, so as to avoid jamming.

FIG. 1 is a schematic diagram showing an association of a wireless local area network 10 with three access points wired on a local area network line 1 and several stations according to the prior art. According to the prior art, it is the stations and access points that decide whether to construct an association based only on the received signal strength indicator (RSSI). As shown in FIG. 1, the access points, 12, 22 and 32, are associated with the wireless local area network 10. Assume the access point 12 uses Channel 1, access point 22 uses the Channel 6 and access point 32 uses the Channel 11. Since the stations, 14, 16 and 18, are closer to the access point 12 and the RSSI from the access point 12 is stronger, the three stations are all associated with the access point 12. The stations, 34, 36 and 38, are all associated with the access point 32 since the stronger RSSI from the access point 32. When a station 40 tries to associate with the service set consisting of the access points, 12, 22 and 32, it will perform a scanning procedure to receive the beacon frame or the probe-response frame transmitted by the access points, 12, 22 or 32, and store the strengths of these packets. After the scanning procedure, the station 40 will select and associate with an access point with the strongest RSSI, i.e., the station 40 will associate with the access point 32. However, when the station 40 associates with the access point 32, the access point 32 has to provide transmission service to the station, 34, 36, 38 and 40, simultaneously. The service quality provided by the access point 32 is further decreased due to the overload. Contrary to the access point 32, the access point 22 is idle since it does not associate with any station.

According to the prior art, the station decides whether to associate with an access point only based on the RSSI. However, the prior art will lead many stations to associate with a minority of access points such as the access point 32. The transmission quality is decreased due to the overload of the access point, but some adjacent access points, such as the access point 22 are idle. In short, the prior art will lead to the unbalanced load between the access points with the same service set identifier.

SUMMARY OF THE INVENTION

The objective of the present invention is to provide a method for balancing the load of a wireless local area network, which can balance the load of the access points with the same service set identifier to ensure the transmission quality of the wireless local area network.

In order to achieve the above-mentioned objective and avoid the problems of the prior art, the present invention provides a method for balancing the load of a wireless local area network. The wireless local area network comprises a plurality of access points with the same service set identifier. The method first selects an access point with the lowest load, which will send a probe-response frame for replying to the probe-request frame sent by a station, and then constructs an association between the station and the access point with the lowest load, so as to balance the load of the plurality of access points. To select the access point with the lowest load, a master access point sends a load collection packet, and the access points with the same service set identifier send a load index packet when receiving the load collection packet. Afterwards, each access point performs a load comparison procedure to select the access point with the lowest load. The load comparison procedure is started with the collection of a load index packet, and each access point compares its own load with the load of the other access point. Then, the access point with the lowest load will turn on the probe-response function, and the other access point will turn off the probe-response function. As a result, when a station sends a probe-request frame, only the access points with the lowest load will reply to the probe-response frame, while the other access point with the same service set identifier do not reply.

The master access point can be the one with the lowest load or the one first booted. Otherwise, a group reconstruction procedure can be performed to elect the master access point with the lowest load. The group reconstruction procedure is performed by sending a group reconstruction packet with load information, and each access point compares its own load with the load of the other access point. The access point with the lowest load will become the master access point and enter the master mode, while the other access points become slave access point and enter the slave mode.

Compared with the prior art using the RSSI as the basis, the present invention uses the load of the access points as the basis for deciding whether to construct an association or not. Therefore, a new association is always constructed between the incoming station and the access point with the lowest load, and the load of the access points with the same service set identifier are balanced to ensure the transmission quality of the local area network.

BRIEF DESCRIPTION OF THE DRAWINGS

Other objectives and advantages of the present invention will become apparent upon reading the following description and upon reference to the accompanying drawings in which.

DESCRIPTION OF THE PREFERRED EMBODIMENTS

Figure 1:
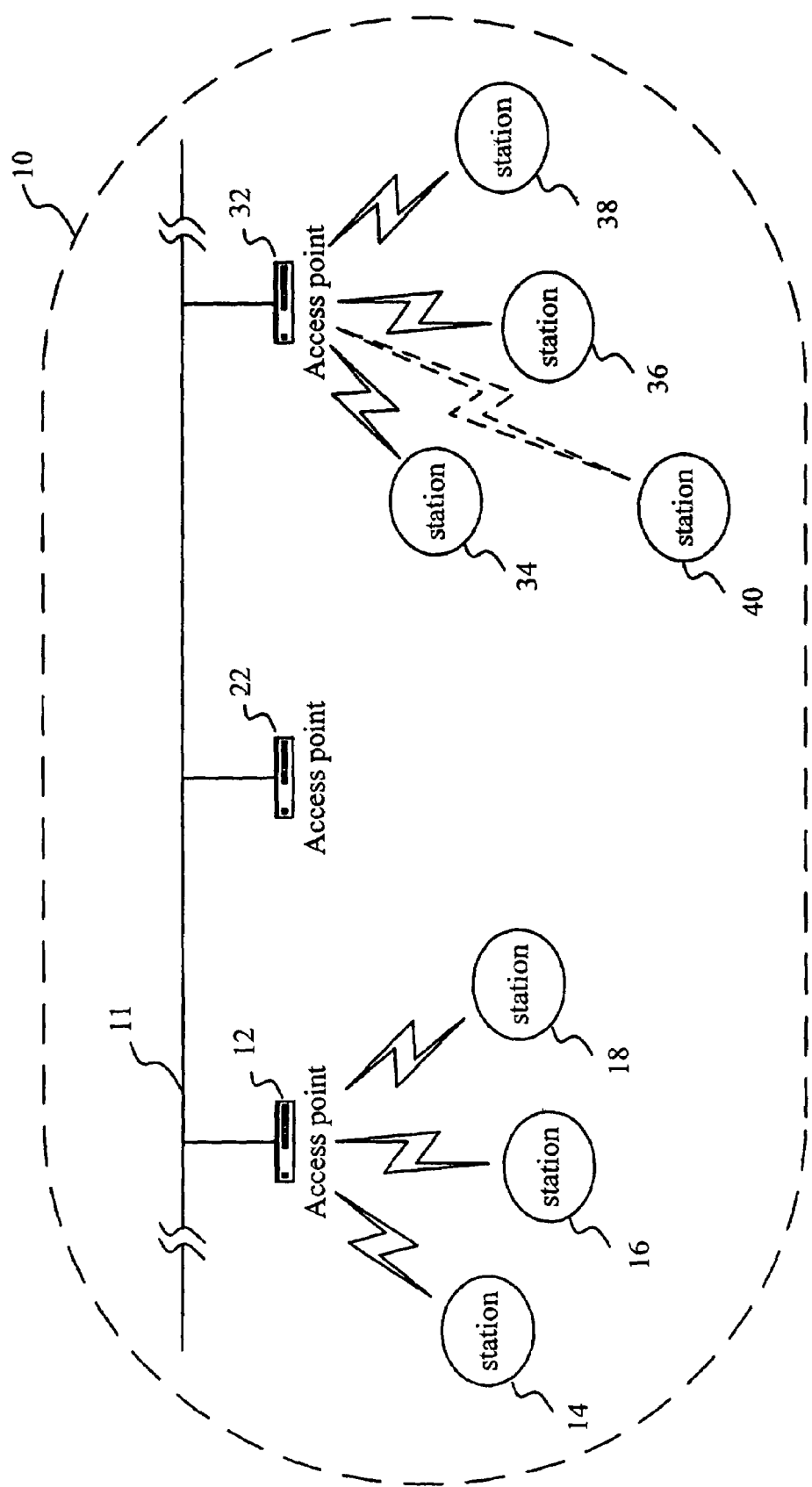
FIG. 1 is a schematic diagram showing the association of a wireless local area network with three access points and seven stations according to the prior art.
Figure 2:
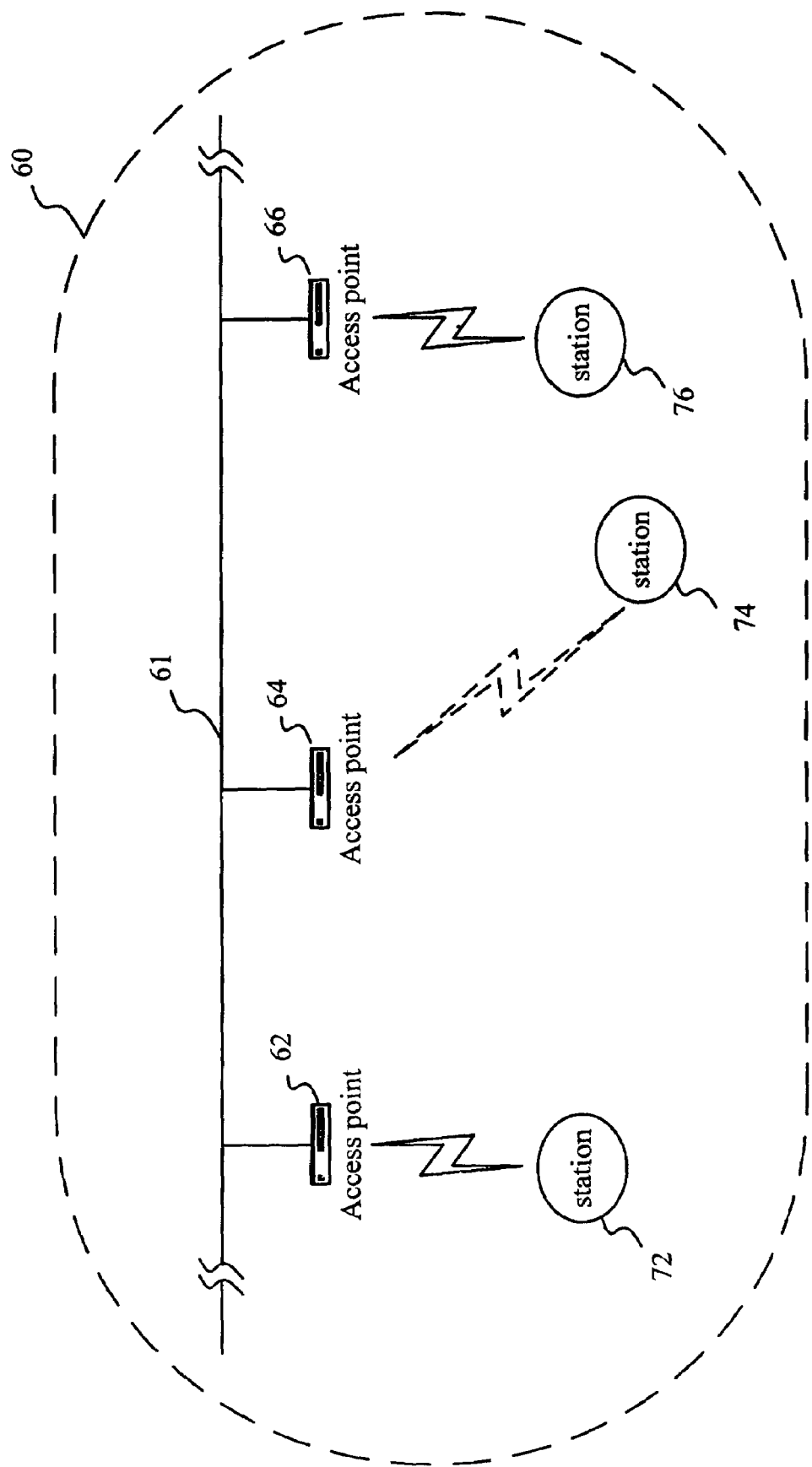
FIG. 2 is a schematic diagram showing the method for balancing the load of a wireless local area network according to the present invention.

FIG. 2 is a schematic diagram showing the method for balancing the load of a wireless local area network 60 according to the present invention. As shown in FIG. 2, the wireless local area network 60 comprises three access points 62, 64 and 66 wired on a network line 61 and with the same service set identifier. The access point 62 uses the channel 1 and associates with a station 72, the access point 64 uses the channel 6 and associates with a station 74, and the access point 66 uses the channel 11 and associates with a station 76. The access point 62 is set to be a master access point, while the access point 64 and access point 66 are slave access points. The master access point can be the one first booted, or set to be the one of the access points, 62, 64 and 66, by turn.

Figures 3, 4:
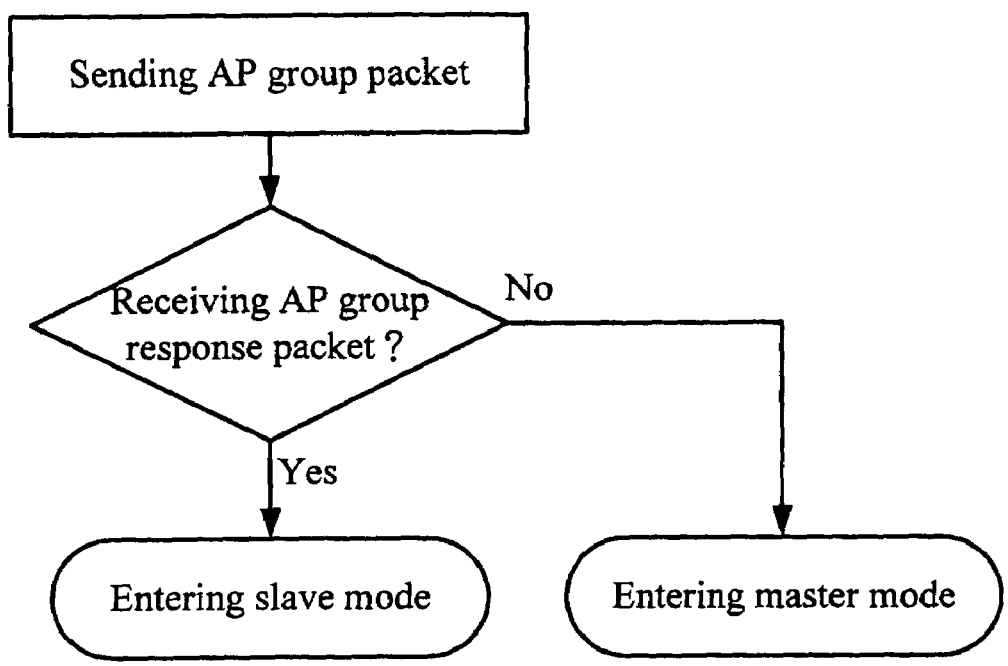
FIG. 3 is a flow chart showing the access point group construction procedure according to the present invention.
FIG. 4 is a schematic diagram showing the format of an access point group packet and an access point group response packet according to the present invention.

FIG. 3 is a flow chart showing the access point group construction procedure according to the present invention. As shown in FIG. 3, an access point first sends an AP group packet 50, and waits for receiving an AP group response packet 51. The AP group packet 50 and the AP group response packet 51 comprise a function ID field, a signature field and a group ID field, as shown in FIG. 4. The difference between AP group packet 50 and AP group response packet 51 is that the function ID fields are set to 0 for AP group packet 50 and 1 for AP group response packet 51, respectively. If the access point receives the AP group response packet 51, it will enter the slave mode since there is already a master access point in the group. If the access point does not receive any AP group response packet 51 within a predetermined time interval, i.e., the access point is the first one booted, it will enter the master mode and become the master access point.

Figure 5:
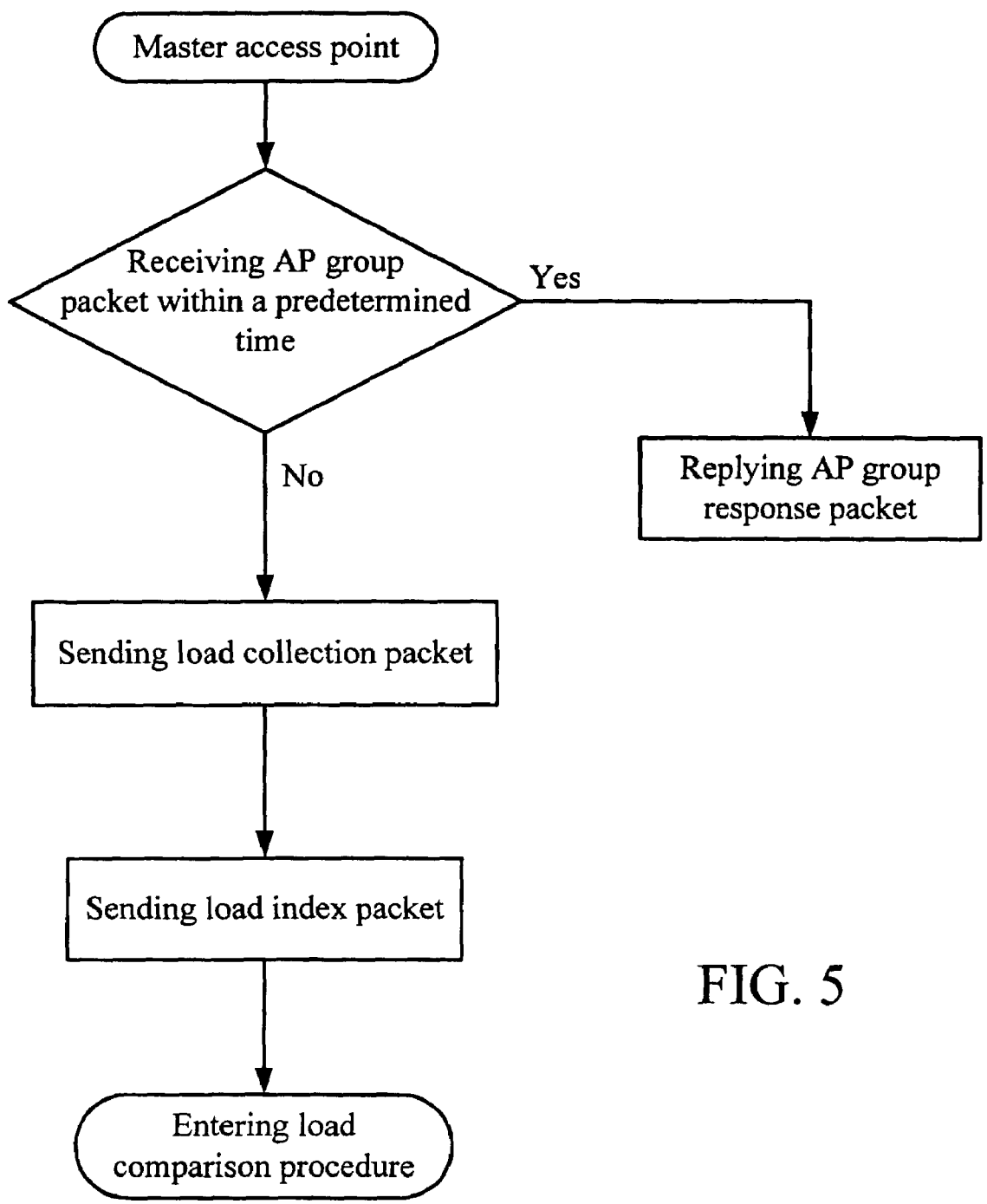
FIG. 5 is a flow chart showing the operation of a master access point according to the present invention.

FIG. 5 is a flow chart showing the operation of a master access point according to the present invention. As shown in FIG. 5, the master access point will send the AP group response packet 51 for replying to the AP group packet 50 to declare that there is a master access point in the group. The master access point periodically sends a load collection packet 52 to the access points with the same service set identifier. Then, the access point (including the master access point) replies a load index packet 53 to the access points with the same service set identifier on receiving the load collection packet 52, and performs a load comparison procedure.

Figures 6, 7:
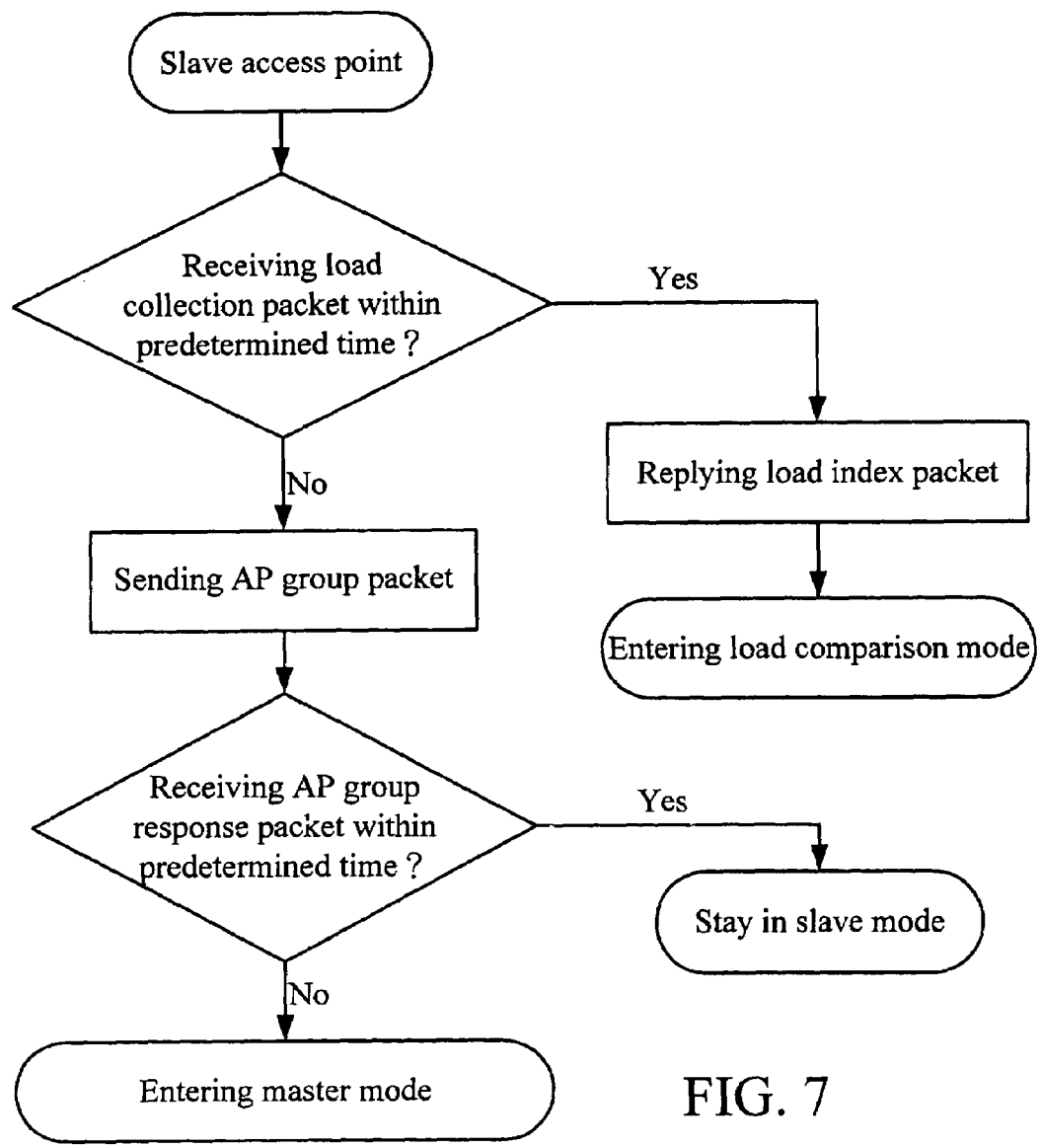
FIG. 6 is a schematic diagram showing the format of a load collection packet and a load index packet according to the present invention.
FIG. 7 is a flow chart showing the operation of a slave access point according to the present invention.

FIG. 6 is a schematic diagram showing the format of the load collection packet 52 and the load index packet 53 according to the present invention. The load collection packet 52 comprises a function ID field, a signature field, a group ID field and a sequence number field. The format of the load index packet 53 is similar to the load collection packet 52, but further comprises a load index field. The content of the sequence number field is the same for both the load collection packet 52 and the load index packet 53, but the function ID fields are set to 2 for the load collection packet 52 and 3 for the load index packet 53, respectively.

FIG. 7 is a flow chart showing the operation of a slave access point according to the present invention. When receiving the load collection packet 52, the slave access point replies with the load index packet 53 to the access points with the same service set identifier and performs a load comparison procedure. If the slave access point does not receive any load collection packet 52 within a predetermined time, the master access point is probably off-lined and there is no master access point in the group, and a group reconstruction procedure will be performed to generate the master access point.

Figures 8, 9:
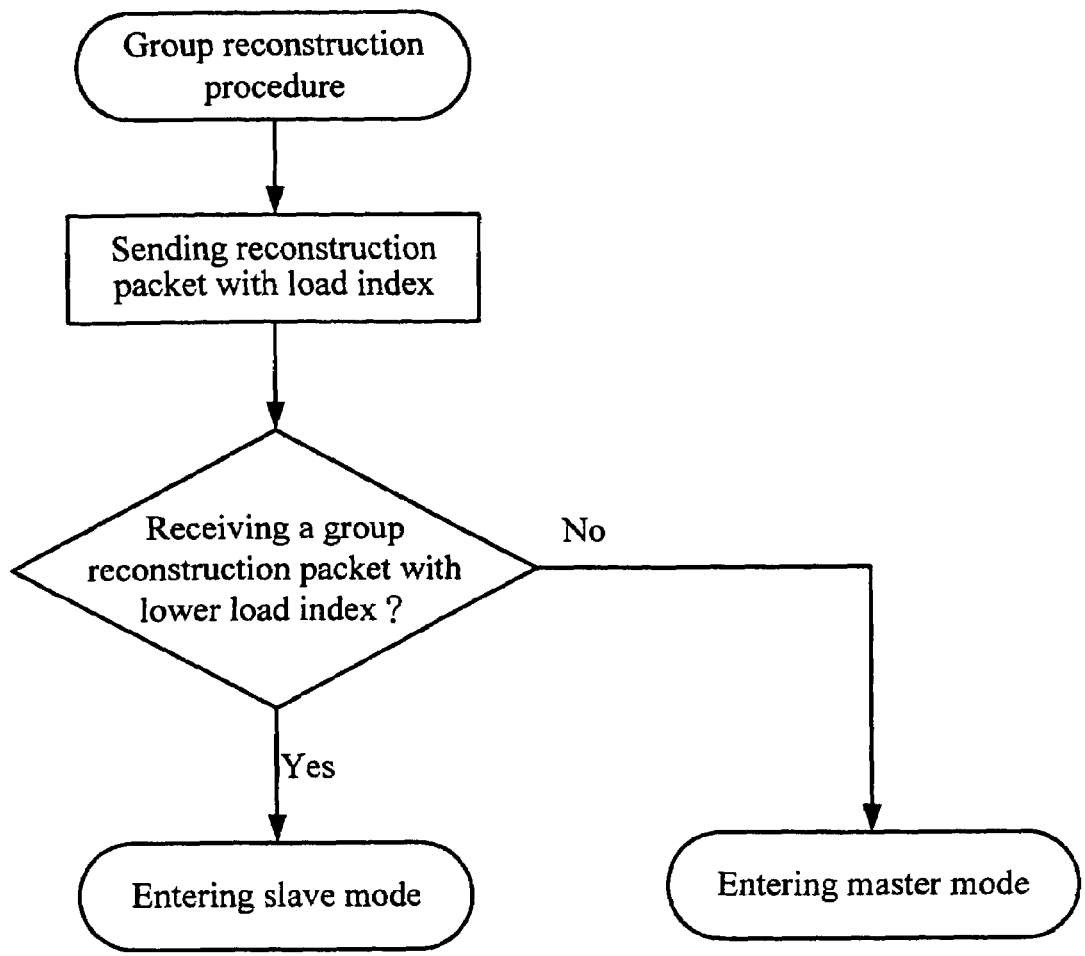
FIG. 8 is a flow chart showing the group reconstruction procedure according to the present invention.
FIG. 9 is a schematic diagram showing the format of a group reconstruction packet according to the present invention.

FIG. 8 is a flow chart showing the group reconstruction procedure according to the present invention. All the slave access points with the same service set identifier will send a group reconstruction packet 54. The format of the group reconstruction packet 54 comprises a function ID field, a signature field, a group ID field and a load index field, as shown in FIG. 9. When receiving the group reconstruction packet 54, the slave access point will compare its own load and the load recorded in the group reconstruction packet 54. If the slave access point does not receive a group reconstruction packet 54 with a lower load, it will enter the master mode and become the master access point of the group. Otherwise, it will stay in the slave mode. Briefly stated, the group reconstruction procedure is performed to elect an access point with the lowest load as the master access point according to the present invention.

Figure 10:
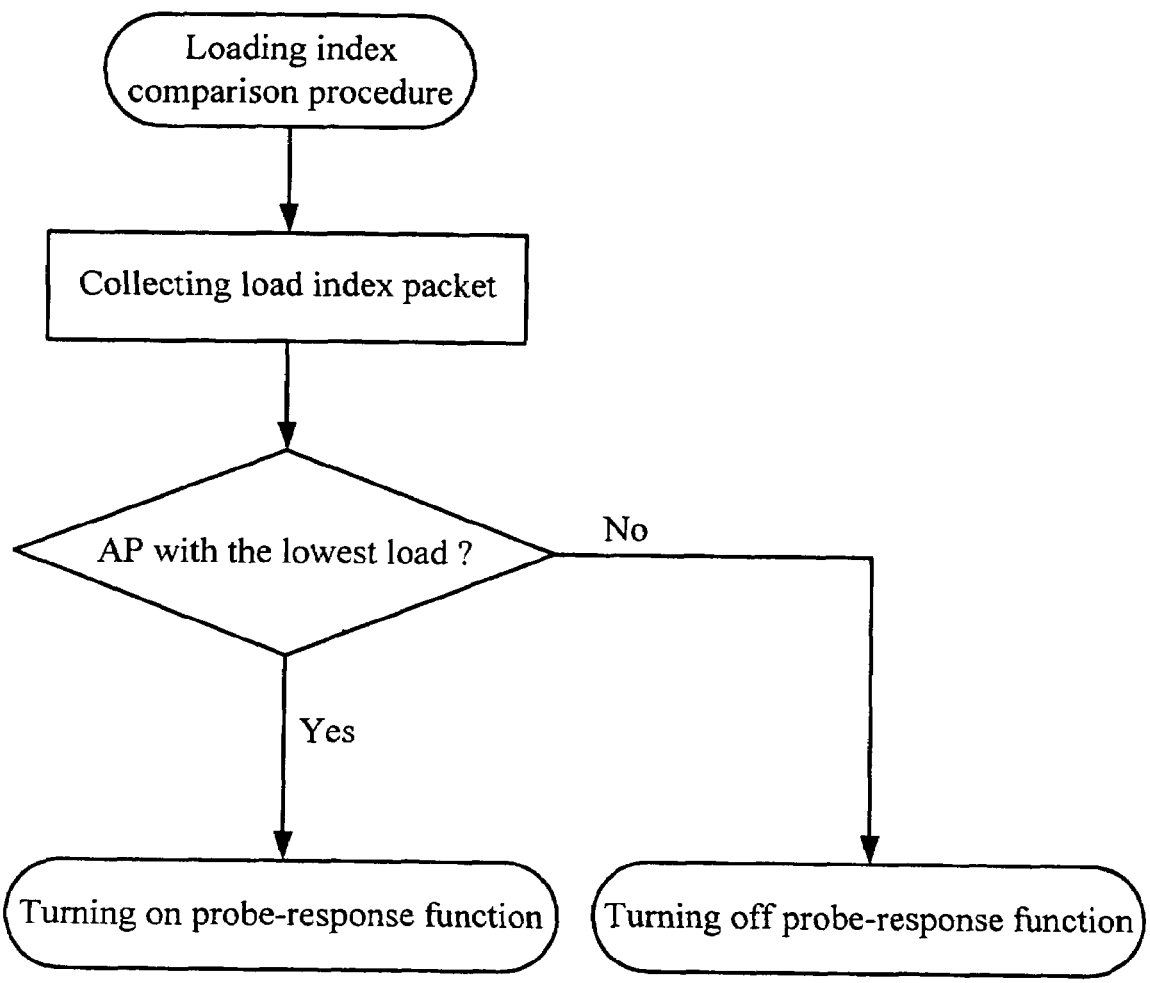
FIG. 10 is a flow chart showing the load comparison procedure according to the present invention.

FIG. 10 is a flow chart showing the load comparison procedure according to the present invention. First of all, the access point with the same service set identifier will collect load index packet 53, and compare its own load with the load recorded in the load index packet 53. The access point will turn on the probe-response function if its own load is the lowest, or turn off the probe-response function. As a result, only one of the access points with the same service set identifier can send the probe-response frame.

Referring to FIG. 2, when the station 72 needs to associate with the service set consisting of the access points, 62, 64 and 66, it will send a probe-request frame. The access point 62 and access point 66 do not reply any frame to the station 72, but the access point 64 will reply a probe-response frame and perform an association procedure to construct an association between the station 72 and the access point 64. Since a new association is always constructed between the incoming station and the access point with the lowest load, and the load of the access points with the same service set identifier can be balanced according to the present invention.

Compared with the prior art using the RSSI as the basis, the present invention uses the load of the access points as the basis for deciding whether to construct an association or not. Therefore, a new association is always constructed between the incoming station and the access point with the lowest load, and the load of the access points with the same service set identifier are balanced to ensure the transmission quality of the local area network.

The above-described embodiments of the present invention are intended to be illustrative only. Numerous alternative embodiments may be devised by those skilled in the art without departing from the scope of the following claims.

What is claimed is:

1. A method for balancing the load of a wireless local area network, the wireless local area network comprising a plurality of access points forming a service set, the method comprising the steps of:

sending a probe-request frame for association with said service set from a station to said plurality of access points;

selecting an access point with the lowest load;

sending a probe-response frame from the access point with the lowest load to the station; and constructing an association between the station and the access point with the lowest load for balancing the load of said plurality of access points.

2. The method for balancing the load of a wireless local area network of claim 1, wherein the step of selecting an access point with the lowest load access point includes the substeps of:

selecting an access point as a master access point and assigning the other access points as slave access points;

sending a load collection packet from the master access point to the slave access points;

returning load index packets with load information from the slave access points; and performing a load comparison procedure to select an access point with the lowest load according to the load index packets.

3. The method for balancing the load of a wireless local area network of claim 2, wherein the load comparison procedure comprises the substeps of:

collecting the load index packets sent from the other access points by each access point;

comparing its own load by each access point with the loads of the 5 other access points; and turning on a probe-response function of the access point with the lowest load, and turning off the probe-response function of the other access points.

4. The method for balancing the load of a wireless local area network of claim 2, wherein the master access point is the access point booted first.

5. The method for balancing the load of a wireless local area network of claim 2, further comprising a group reconstruction procedure for selecting the access point with the lowest load as the master access point.

6. The method for balancing the load of a wireless local area network of claim 5, wherein the group reconstruction procedure comprises the substeps of:

sending group reconstruction packets with load information from said 20 plurality of access points;

comparing its own load by each access point with the loads of the other access points; and setting the access point with the lowest load as the master access point.

7. The method for balancing the load of a wireless local area network of claim 1, wherein the plurality of access points have the same basic service set identifier.

8. The method for balancing the load of a wireless local area network of claim 1, wherein the access point with the lowest load replies a probe-response frame to the station and the other access points do not reply.

9. A wireless local area network system comprising:

a plurality of access points forming a service set; and at least one station configured to send to said plurality of access points a probe-request frame for association with said service set, wherein the system is configured to select an access point with the lowest load and to send a probe-response from the access point wit the lowest load to said station and wherein the system is further configured to construct an association between the station and the access point with the lowest load.

* * * * *